(12) United States Patent
Selegean

(10) Patent No.: US 11,526,604 B2
(45) Date of Patent: Dec. 13, 2022

(54) SYSTEM FOR EVENT DETECTION, DATA INTEGRATION, AND DATA VISUALIZATION

(71) Applicant: Bank of America Corporation, Charlotte, NC (US)

(72) Inventor: Jane Selegean, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 272 days.

(21) Appl. No.: 16/880,699

(22) Filed: May 21, 2020

(65) Prior Publication Data

US 2021/0365551 A1 Nov. 25, 2021

(51) Int. Cl.
  *G06F 21/55* (2013.01)
  *G06F 9/54* (2006.01)
  *G06F 11/30* (2006.01)
  *G06Q 20/38* (2012.01)

(52) U.S. Cl.
  CPC ............ *G06F 21/554* (2013.01); *G06F 9/542* (2013.01); *G06F 11/3027* (2013.01); *G06Q 20/382* (2013.01); *G06F 2201/86* (2013.01)

(58) Field of Classification Search
  CPC .... G06F 21/554; G06F 9/542; G06F 11/3022; G06F 2201/86; G06Q 20/382
  See application file for complete search history.

(56) References Cited

U.S. PATENT DOCUMENTS

| | | |
|---|---|---|
| 6,154,756 A | 11/2000 | Hearn et al. |
| 6,253,205 B1 | 6/2001 | Quarato et al. |
| 8,099,674 B2 | 1/2012 | Mackinlay et al. |
| 8,423,651 B1 | 4/2013 | Grieve et al. |
| 8,521,774 B1 | 8/2013 | Cai et al. |
| 8,577,833 B2 | 11/2013 | Erla et al. |
| 8,589,338 B2 | 11/2013 | Maes |
| 8,626,865 B1 | 1/2014 | Phillips et al. |
| 9,720,958 B2 | 8/2017 | Bagehorn et al. |
| 10,025,803 B2 | 7/2018 | Bester et al. |
| 10,042,732 B2 | 8/2018 | Wu et al. |
| 10,055,455 B2 | 8/2018 | Bagehorn et al. |
| 10,102,258 B2 | 10/2018 | Jacob et al. |
| 10,181,051 B2 | 1/2019 | Barday et al. |
| 10,346,429 B2 | 7/2019 | Jacob et al. |
| 10,353,911 B2 | 7/2019 | Reynolds et al. |
| 10,452,677 B2 | 10/2019 | Jacob et al. |
| 10,452,975 B2 | 10/2019 | Jacob et al. |
| 10,496,926 B2 | 12/2019 | Florissi et al. |

(Continued)

*Primary Examiner* — Walter J Divito
*Assistant Examiner* — Anthony Luo

(57) ABSTRACT

A system includes one or more data sources. Each data source is configured to collect and store event data. An event bus is configured to monitor the event data of the one or more data sources. The event bus determines that a first portion of the monitored event data satisfies a first task criteria. The first portion of the monitored event data is associated with a first tag that corresponds to the first task. The event bus determines that a second portion of the monitored event data satisfies a second task criteria. The second portion of the monitored event data is associated with a second tag corresponding to the second task. The first portion of the monitored event data with the first tag and the second portion of the monitored event data with the second tag are provided for storage in a data lake.

20 Claims, 4 Drawing Sheets

(56) References Cited

U.S. PATENT DOCUMENTS

| | | |
|---|---|---|
| 10,515,085 B2 | 12/2019 | Jacob et al. |
| 10,528,554 B2 | 1/2020 | Bagehorn et al. |
| 10,540,358 B2 | 1/2020 | Wu et al. |
| 2003/0177481 A1 | 9/2003 | Amaru et al. |
| 2004/0034860 A1 | 2/2004 | Fernando et al. |
| 2004/0210838 A1 | 10/2004 | Wason |
| 2004/0225962 A1 | 11/2004 | Hashi et al. |
| 2005/0149506 A1 | 7/2005 | Hatscher et al. |
| 2005/0187952 A1 | 8/2005 | Werner |
| 2011/0145217 A1 | 6/2011 | Maunder et al. |
| 2011/0295945 A1 | 12/2011 | Lord |
| 2011/0296321 A1 | 12/2011 | Lord |
| 2011/0320971 A1 | 12/2011 | Seeger et al. |
| 2012/0011167 A1 | 1/2012 | Schmidt |
| 2012/0240084 A1 | 9/2012 | Polubinski et al. |
| 2013/0054655 A1 | 2/2013 | Coyne |
| 2014/0279676 A1 | 9/2014 | Schafer et al. |
| 2017/0322993 A1* | 11/2017 | Brodt .................. G06F 16/2358 |
| 2018/0039679 A1 | 2/2018 | Endres |
| 2019/0260805 A1 | 8/2019 | Barday et al. |
| 2020/0184050 A1* | 6/2020 | Toth ........................ G06F 21/32 |
| 2020/0382868 A1* | 12/2020 | Felton ..................... G06F 9/542 |
| 2021/0034440 A1* | 2/2021 | Arendt ................ G06F 11/3086 |
| 2021/0051044 A1* | 2/2021 | Wondra .............. H04L 12/4633 |

* cited by examiner

SYSTEM FOR EVENT DETECTION, DATA INTEGRATION, AND DATA VISUALIZATION

TECHNICAL FIELD

The present disclosure relates generally to information technology systems. More particularly, in certain embodiments, the present disclosure is related to a system for event detection, data integration, and data visualization.

BACKGROUND

Entities, such as businesses, governmental agencies, and other organizations, may operate across a broad range of locations and implement a broad range of technologies to perform various tasks and/or provide services. A complex computing infrastructure may be put in place to facilitate the provision of these tasks and/or services and store related information. Information technology professionals are tasked with managing this infrastructure. There exists a need for improved tools for performing these information technology-related tasks.

SUMMARY

In an embodiment, a system includes one or more data sources. Each data source is configured to collect and store event data. The event data, for each data source, includes one or more of telemetry data, event information, and reference data. The telemetry data includes an operational status of the data source. The event information includes information regarding an action performed by a user associated with the data source. The reference data includes a record of an organizational schema of the data source as a function of time. An event bus is configured to monitor the event data of the one or more data sources. The event bus determines that a first portion of the monitored event data satisfies a first task criteria. The first task criteria includes at least one requirement that the first portion of the monitored event data includes a characteristic associated with a first task which may be performed downstream using the first portion of the monitored event data. The first portion of the monitored event data is associated with a first tag that corresponds to the first task. The event bus determines that a second portion of the monitored event data satisfies a second task criteria. The second task criteria include at least one requirement that the second portion of the monitored event data includes a characteristic associated with a second task which may be performed downstream using the second portion of the monitored event data. The second portion of the monitored event data is associated with a second tag corresponding to the second task. The first portion of the monitored event data with the first tag and the second portion of the monitored event data with the second tag are provided for storage in a data lake.

Previous technology lacks tools for streamlining tasks performed by information technology professionals. These professionals are typically tasked with overseeing operation of a range of inter-related systems (e.g., servers, applications, and databases associated with different subgroups or concerns of an entity). For instance, an entity may provide applications (e.g., accessed via a web interface, or the like) to interact with clients, while also maintaining appropriate computing infrastructure for tracking various actions taken by external and internal clients. Many disparate data sources may be put in place to track software, computing infrastructure, and other services provided by the entity. Previous technology lacks tools for translating information from all of these varied data sources into actionable insights for system administrators, such as the information technology professionals described above.

Certain embodiments of this disclosure provide unique solutions to technical problems of previous information technology platforms, including those problems identified above. For example, the disclosed event detection and data integration system provides several technical advantages, which include: 1) the automatic detection of events based on information received from a range of data sources; 2) the initiation of automated and/or human-mediated actions in response to detected events which match certain action criteria; 3) the storage of ingested data based on anticipated downstream tasks which may be performed using the data; and 4) the presentation of ingested data in a user-friendly and user-specific format that facilitates data visualization in a form that is appropriate for both a user's security authorization level and area of operation within an entity operating the system. As such, this disclosure may improve the function of computer systems used to manage servers and host applications. For example, the system described in this disclosure may monitor various data sources (e.g., databases storing information regarding applications, computational infrastructure, transactions, internal human resource services, compliance monitoring, software development life cycles, project management, and the like) to provide actionable insights in real-time or near real-time. The system may also or alternatively reduce or eliminate practical and technical barriers to providing usable data (i.e., data in a user-interpretable form) to appropriate administrators and other individuals (e.g., from different business groups). The systems described in this disclosure may particularly be integrated into a practical application of an information technology management platform, which monitors various data sources of an entity, and provides various previously unavailable services, such as near real-time updating of a data lake with information tagged for more efficient downstream usage, mapping between detected events and services provided by the business/entity, detection and automated resolution of certain unwanted events, and automatic flagging of events that involve human resolution.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The complexity of computing environments, which can include ranges of different server configurations, a variety of application stacks, and different database schemas, results in disjointed data streams from the various data sources used to track and manage the computing environment, making it difficult or impossible using previous technology to not only derive insights from how the computing environment is being operated but also to execute changes based on these insights. The different channels available for the delivery of data to an end user include, for example, application programming interfaces (APIs), host-to-host file transfer/mapping, online portals, and mobile applications. Previous technology is not forward compatible when a computing environment adopts new data types, new data sources, and/or new computing configurations arise regularly. The system described in this disclosure overcomes these and other technical problems of previous technology by providing forward-compatible data integration resources as well as tools for facilitating event mapping, efficient event responses, and improved data visualization.

Event Detection and Data Integration System

Figure 1:
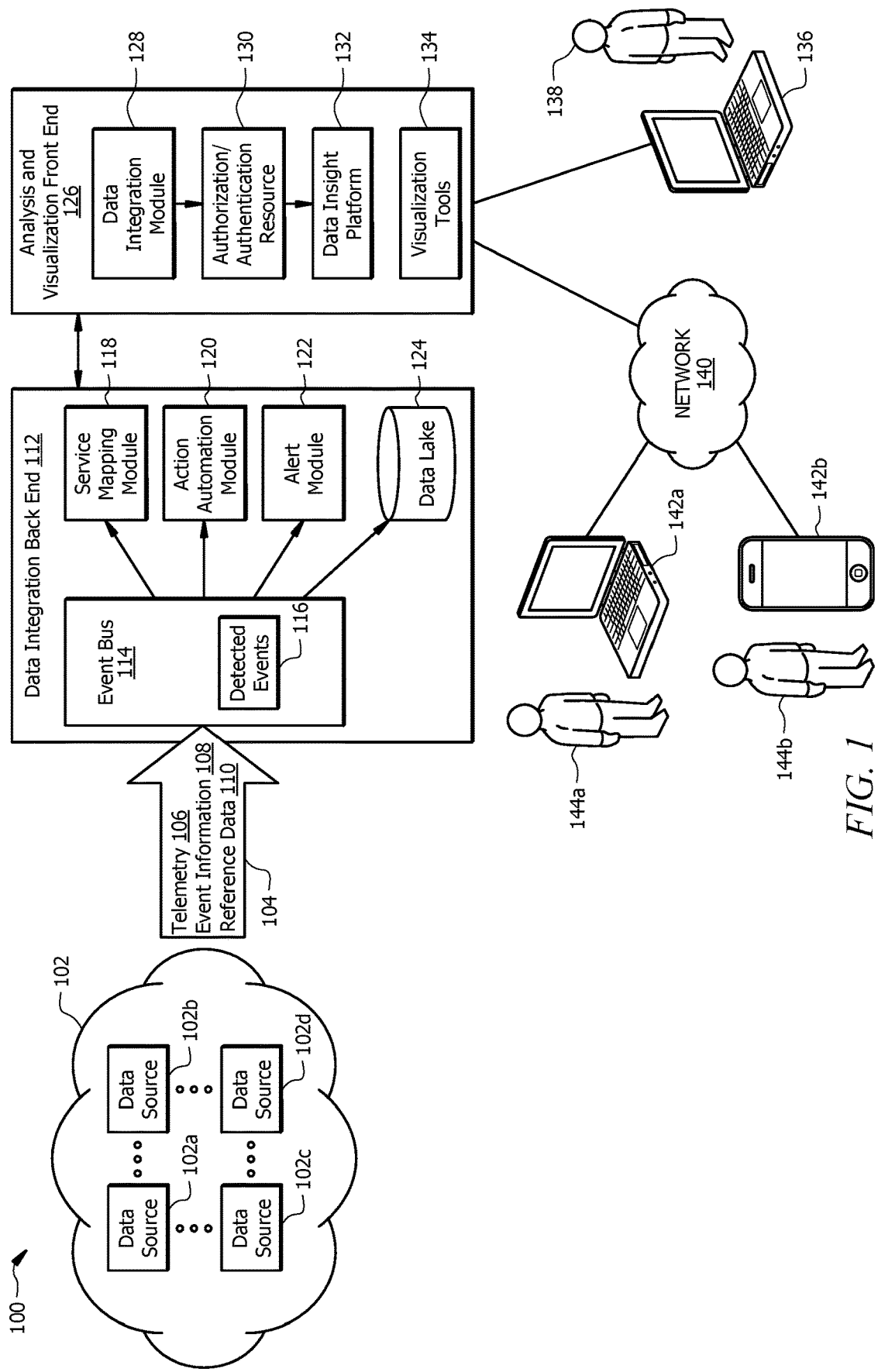
FIG. 1 is a schematic diagram of an example system for event detection and data integration.

FIG. 1 is a schematic diagram of an example system 100 for event detection, data integration, and data visualization. The system 100 includes one or more data sources 102, a data integration front end 112, a front end 126 for data analysis and visualization, user devices 136, 142a,b, and a network 140. As described in greater detail below with respect to FIGS. 2-3, the system 100 generally facilitates the automation and/or performance of a broad range of information technology related tasks across platforms in a user-friendly manner. Information from a variety of disparate data sources 102a-d can be collected and appropriately directed for appropriate use. For instance, event data 104 may be ingested by an event bus 114 and directed to modules 118, 120, 122 to map detected events 116 to related services, and/or resolve actions either automatically or via human engagement. The ingested data 104 is also stored in a data lake 124 using a schema that accounts for the anticipated downstream usage of the data 104. Certain insights requested by individuals who lack specialized training in information technology can thus access desired information without having advanced knowledge in the architectures employed, thereby allowing actionable insights to be provided in near real-time.

Data sources 102 generally include databases (e.g., data warehouses, or data stores of any kind) monitored by the data integration back end 112. The data sources 102 may include any number of data sources 102a-d. Each data source 102a-d may be implemented using the processor, memory, and interface of the device 400 described below with respect to FIG. 4. Each data source 102a-d may generate and/or store event data 104 which is monitored by the back end 112. The event data 104 may include telemetry data 106, event information 108, and/or reference data 110. The telemetry data 106 for a given data source 102a-d generally corresponds to the current status of the data source 102a-d. For example, if data source 102a is associated with an application, the telemetry data 106 for data source 102a may include an indication of whether the application is usable and accessible to users. For instance, the telemetry data 106 associated with a website application may include an indication of whether a website is accessible and/or a measure of the reliability of the website (e.g., a percentage of attempts to access the website that fail). The telemetry data 106 may include a number of users that are currently accessing or otherwise using an application, infrastructure or service associated with a data source 102a-d. For example, if a data source 102b is a database recording transactions by a business entity, the telemetry data 106 for the data source 102b may include the number of transaction currently in progress. If a data source 102c is associated with a particular server configuration, the telemetry data 106 may include a measure of the amount of computing resources being consumed by the server. The telemetry data 106 may include real-time data or near real-time data associated with the data sources 102a-d.

The event information 108 generally includes information about actions currently being taken by users at the data sources 102a-d. For instance, event information 108 may include an indication of a user selection in a data source 102 associated with an application, a change to a schema of a data source 102 associated with a database, a change to a configuration of a data source 102 associated with a server, or the like. The reference data 110 may include a record of how the telemetry data 106 and/or event information 108 has changed over time. For example, the references data 110 for a given data source 102a-d may include information about the architecture of the data source 102a-d and/or a record of how data schemas employed by the data sources 102a-d (e.g., for a database data source 102a-d) change or evolve over time.

The back end 112 is generally implemented using any computing device or collection of computing devices configured to collect event data 104 from the data sources 102, integrate this data 104 for storage in data lake 124, and coordinate with the front end 126 for presentation of the data 104. The back end 112 is installed at the software and hardware level and is channel agnostic. For example, event data 104 can be exposed to the back end 112 through an API, via host-to-host transfer, through a mobile application, through online portals, and the like. The back end 112 may be installed in an operating system and/or as part of an application. The back end 112 may include an event bus 114, a service mapping module 118, an action automation module 120, an alert module 122, and a data lake 124. The back end 112 and an example of its operation are described in greater detail below with respect to FIG. 2. The back end 112 may be implemented using the processor, memory, and interface of the device 400 described below with respect to FIG. 4.

The event bus 114 acts as an intermediary that extracts event data 104 from the data sources 102. The event bus 114 generally ingests the event data 104 and ushers the ingested data 104 toward the correct module(s) 118, 120, 122 and into storage in the appropriate form in the data lake 124. In some embodiments, the event bus 114 acts as "middleware" between the data sources 102 and the data lake 124 and various module(s) 118, 120, 122. The event bus 114 decides where to send event data 104 and how to digest this data 104. Digestion of event data 104 may involve any appropriate preprocessing and reconfiguration. For example, a set of predefined criteria or rules may be employed to detect one or more events 116 associated with the event data 104, determine how event data 104 should be ushered into the different modules 1018, 120, 122 described below, and determine how the event data 104 should be stored in the data lake 124 (i.e., with appropriate tags that link the event data 104 to anticipated downstream uses, for example, for analytics, audit trail management, security assessment, and the like). In some embodiments, a method of machine learning or artificial intelligence is employed by the event bus 114 to detect events 116 and appropriately store the event data 104 in the data lake 124 such that it may be efficiently accessed for downstream processing (e.g., by the front end 126, described further below and with respect to FIG. 3). For example, the predefined criteria described above may be established using training data which includes previously detected events based on sample event data 104 and/or previously stored sample data 104 that are known to be associated with certain tasks. Example operation of the event bus 114 is described in greater detail below with respect to FIG. 2.

The service mapping module 118 is a resource within the back end 112 which facilitates the mapping of a detected event 116 to one or more services provided by the entity operating the system 100. For example, the event bus 114 may detect an event 116 and provide this event 116 to the service mapping module 118 to perform service mapping. The service mapping module 118 generally determines if an event 116 (i.e., the event data 104 associated with the event 116) satisfy predefined criteria for mapping to different services. The criteria may include one or more requirements that the event data 104 includes one or more characteristics associated with a service provided by the business or entity operating the system 100 (e.g., services associated with the different data sources 102 (see also description of data sources 102 provided below with respect to FIG. 2). For example, if the event data 104 for a detected event 116 include information about funds expended to pursue a project goal, the event 116 may be mapped to project management services. The service mapping module 118 may generate a service map, which is available for viewing via the front end 126. Operation of the service mapping module 118 is described in greater detail below with respect to FIG. 2.

The action automation module 120 is a resource provided within the back end 112 which facilitates the automatic execution of an action based on a detected event 116. For instance, if a detected event 116 is associated with an unwanted outcome (e.g., a problem or other issue), the action automation module 120 may automatically perform one or more actions to resolve the unwanted outcome. As an example, the back end 112 may detect that an event 116 is associated with an application repeatedly dropping in a certain data center. In response, the action automation module 120 may automatically relocate the application to a different data center. In other words, the action automation module 120 may proactively execute actions based on detected events 116. The event bus 114 generally determines whether the collected event data 104 satisfies predefined criteria for an actionable event having occurred. For example, the criteria may include one or more requirements that the event data 104 includes characteristics (e.g., includes certain information types) associated with a predefined event having occurred. If these criteria are satisfied, the event 116 is passed to the action automation module 120, and an appropriate action is performed based on features of the actionable event 116. Operation of the action automation module 120 is described in greater detail below with respect to FIG. 2.

The alert module 122 may facilitate the efficient and accurate resolution of events 116 that involve actions that cannot be automated. For example, in some cases, an event 116 may be an actionable event, but the required action(s) to resolve the event 116 may need human input, such as review by an administrator 138, 144*a,b* or the like. When a detected event 116 is an actionable event that cannot be handled automatically using the event automation module 120 described above, the event bus 114 may pass the detected event 116 and corresponding event data 104 to the alert module 122. The alert module 122 generally registers that one or more events 116 occurred that require action by an individual (e.g., an administrator 138, 144*a,b*). These actionable events 116 may be placed in an "incident mode," and an alert may be passed to an administrator 138, 144*a,b*. The front end 126 (described further below) may facilitate the user-friendly resolution of such an actionable event 116 by providing not only the indication of the actionable event 116 but also the appropriate context for resolving the event 116 (e.g., the event data 104 may be presented in a user-readable format via the data integration module 128 of the front end 126, as described further below and with respect to FIG. 3). Operation of the alert module 122 is described in greater detail below with respect to FIG. 2.

The data lake 124 may be any data store, or database, operable to receive, store, and/or transmit event data 104 pulled from the data sources 102 and digested by the event bus 116. The data lake 124 may store event data 104 in a schema such that data 104 is tagged for efficiently performing downstream processing tasks (see FIG. 2 and corresponding description below). The data lake 124 may facilitate improved audit tracing, data analytics, data security, and the like by reliably associating ingested event data 104 to anticipated downstream tasks which may be performed using the data 104. For instance, the event bus 114 may detect that certain event data 104 is associated with a given downstream task (e.g., tasks associated with analytics, audit trail management, software development monitoring, predictive modeling, etc.) and tag this data 104 such that it may be efficiently accessed for performing these tasks at a later time. This allocation of tags to the event data 104 may be achieved by determining whether data 106, 108, 100 (e.g., a set of data 106, 108, 100 associated with a given event 116) satisfy certain predefined criteria associated with different downstream tasks. The criteria may include one or more requirements that the event data 104 includes characteristics associated with a known downstream task or tasks which may be performed, for example, using the front end 126. For instance, event data 104 that is associated with attempted access to secure information may be automatically tagged as security-related information, such that it may be more efficiently and conveniently accessed for analysis of security protocols (e.g., using the front end 126 described below). In some embodiments, a detected event 116 that corresponds to given event data 104 is used to further improve the reliability of the association between the event data 104 and the anticipated downstream use of the data 104. This may facilitate improved detection of any departures from normal use of the different data sources 102*a-d* than was possible using previous technology.

The analysis and visualization front end 126 provides a user interface for accessing information from the back end 112, described above. The front end 126 may be implemented using the processor, memory, and interface of the device 400 described below with respect to FIG. 4. In general, the front end 126 facilitates reporting, analytics, and visualization of the event data 104, the detected events 116, and any other information related to the modules 118, 120, 122. The front end 126 includes a data integration module 128, an authorization/authentication resource 130, a data insight platform 132, and one or more visualization tools 134. The front end 126 and its operation are described in greater detail below with respect to FIG. 3.

In brief, the data integration module 128 generally facilitates the efficient streamlining of information from the back end 112 to the front end 126 in a form that is useful to the downstream user (e.g., the user 138, 144*a,b* currently accessing a user interface generated by the front end 126). The data authorization/authentication resource 130 acts as a security layer for the front end. The authorization/authentication resource 130 generally provides for the authentication and authorization of users 138, 144a,b to ensure that only appropriate information is provided to the users (i.e., based on their security clearance or authorization levels). The data insight platform 132 generally includes resources for analyzing and/or gaining other insights from the event data 104 accessed by the front end 126. The visualization tools 134 include an array of graphic user interface-based tools which provide interaction with and visualization of information from the data lake 124 and/or the various modules 118, 120, 122 described above.

The devices 136, 142a,b are generally any computing devices operable to view information provided via the front end 126. As illustrated for the example device 136 of FIG. 1, in some cases the front end 126 may be implementing using the user device 136. As illustrated for devices 142a,b, in other cases the front end 126 may be communicatively coupled to a device 142a,b (e.g., via network 140). A user 136, 142a,b of a corresponding device 136, 142a,b may be an administrator of the system 100, of one or more of the data sources 102, or a user associated with the entity (e.g., business, governmental agency, etc.) operating the system 100. Each of the devices 136, 142a,b includes a display for presenting information provided by the front end (e.g., event data 104, detected events service mappings from the service mapping module 118, indications of automated actions from the action automation module 120, alerts associated with a need to take an action from the alert module 122, and the like). Each of the user devices 136, 142a,b may be implemented using the processor, memory, and interface of device 400 described with respect to FIG. 4 below.

Network 140 facilitates communication between and amongst the various components of the system 100. This disclosure contemplates network 140 being any suitable network operable to facilitate communication between the components of the system 100. Network 140 may include any interconnecting system capable of transmitting audio, video, signals, data, messages, or any combination of the preceding. Network 140 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, the event bus 114 monitors event data 104 associated with a transaction occurring. This example event data 104 includes event information 108 from an application data source 102 indicating a user selected to submit a request to send funds, event information 108 from a transaction data source 102 indicating receipt of the submitted funds, information regarding the destination of the submitted funds, and any other information related with the transaction. The event bus 114, employs task criteria (e.g., criteria 224 described with respect to FIG. 2 below) to associate this event data 104 with the downstream task of transaction analysis, user transaction logging (i.e., for the user submitting the funds), and application logging (e.g., for tracking usage of the application used by the user). The event bus 114 appropriately tags the event data 104 to associate it with these different downstream tasks and stores it in an appropriate schema (e.g., facilitated by the tags) within the data lake 124. At a later time, a user or administrator 138, 144a,b may request to analyze a transaction log associated with the user who submitted the funds, the destination of the funds, and/or usage of the application. Because of the unique schema of the data lake 124, the appropriate event data 104 may be efficiently accessed for these data analysis and visualization tasks.

Still referring to this example operation, in response to receipt of this event data 104 associated with a transaction, the event bus 114 may detect a transaction event 116. The event 116 may be passed to the service mapping module 118 where the event 116 is mapped to the transaction service based on the characteristics of the event data 104. The event bus 114 may also determine that actions should be taken in response to the detected event 116. For example, the event bus 114 may identify that a transaction authorization message should be provided to the user submitting the funds before the transaction is allowed to proceed. This may trigger the action automation module 120 to send a confirmation request to the user submitting the funds. A record of the automated action may be visible via the front end 126. The event bus 114 may further detect that a human-mediated action is needed, for example, because the amount of funds included in the transaction is outside a range of values expected for the user. This information may be passed to the alert module 122 such that an appropriate administrator 138, 144a,b may be notified (e.g., via the front end 126) of the unusual transaction and appropriate review may be performed.

Data Integration Back End

Figure 2:
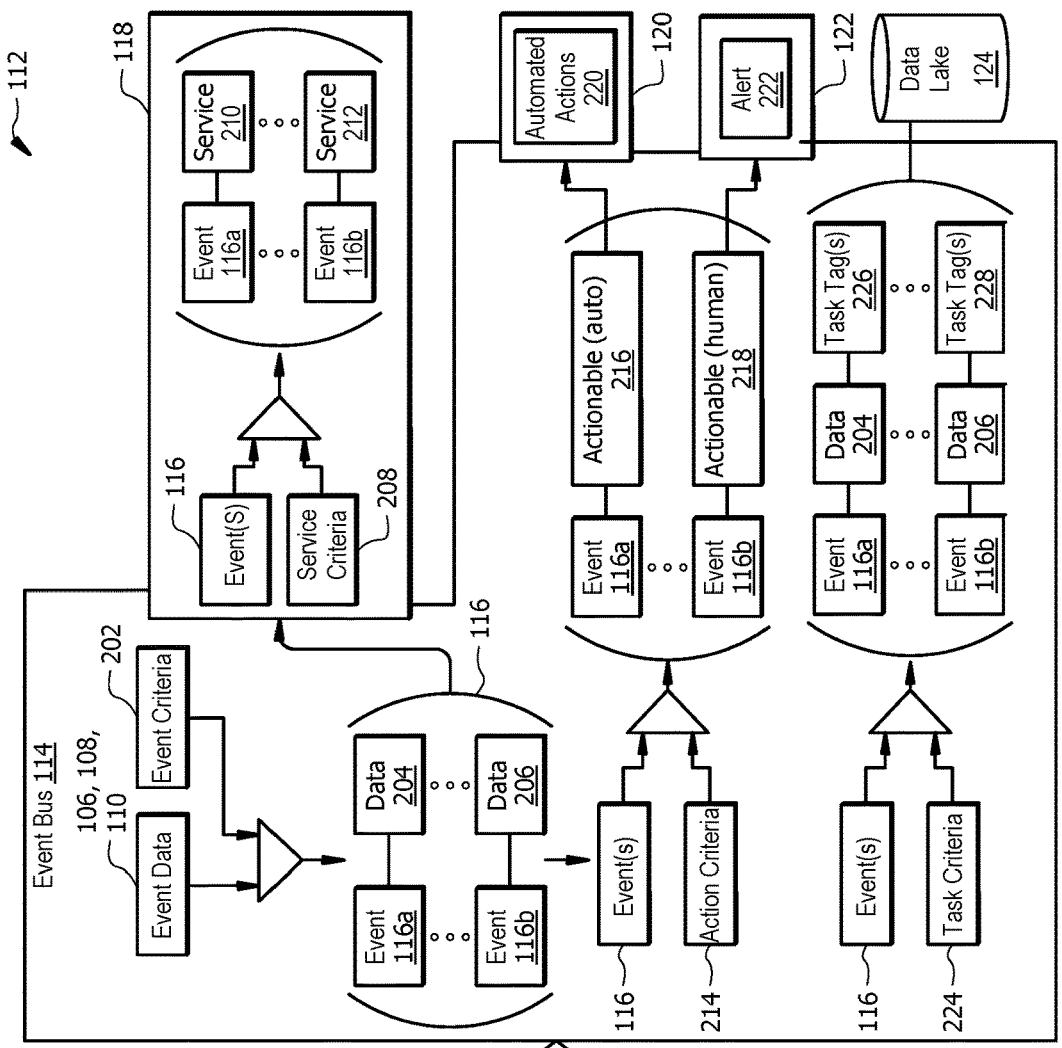
FIG. 2 is a flow diagram illustrating example operation of the system illustrated in FIG. 1.
Figure 2:
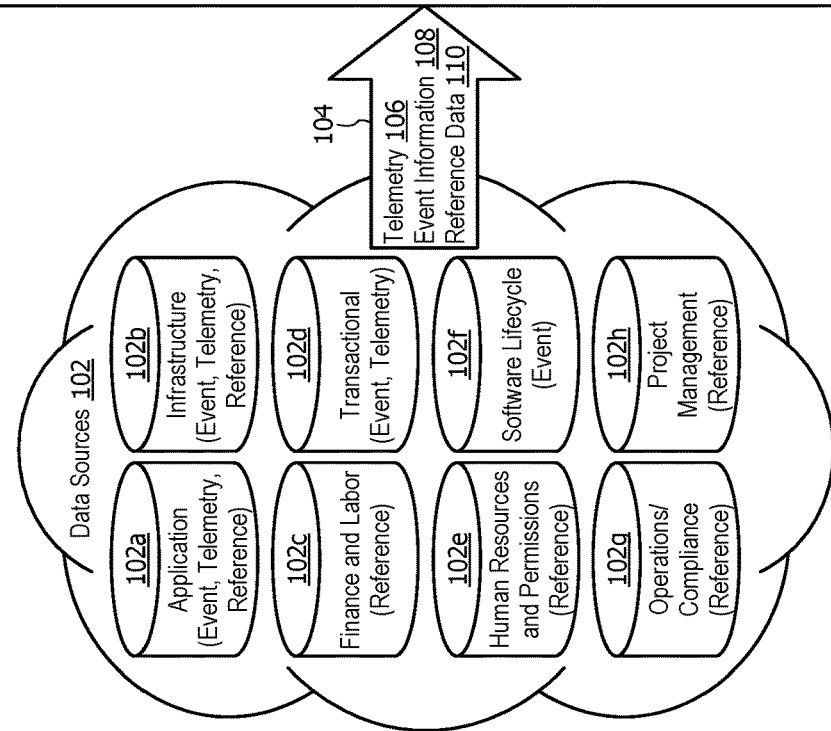

FIG. 2 illustrates operation of the data integration back end 112 of FIG. 1 in greater detail. The back end 112 generally monitors event data 104 from data sources 102 and uses this data 104 to detect events 116. Examples of detected events 116 include a client or customer interacting with an application and/or completing a transaction, an individual at the business or entity performing a task associated with human resources or project management, an administrator changing a configuration of a computing infrastructure, a developer updating software used by the business or entity, and the like. The data bus 114 may pass detected events 116 to the service mapping module 118 so that the events 116 can be mapped to corresponding services 210, 212 offered or performed by the business or entity. The event bus 114 may further determine whether events 116 are actionable events and pass any actionable events to the action automation module 120 and/or alert module 122, such that necessary actions can be performed proactively. The event bus 114 also identifies any anticipated tasks or downstream uses of the monitored data 104 and tags the data 104 with task tags 226, 228 for storage in the data lake 124.

As described above, the back end 112 may monitor event data 104 from any number of appropriate data sources 102 for a given business or entity that operates the system 100. The example data sources 102 illustrated in the FIG. 2 include an application data source 102a, an infrastructure data source 102b, a finance and labor data source 102c, a transactional data source 102d, a human resources and permission data source 102e, a software development lifecycle data source 102f, an operations and compliance data source 102g, and a project management data source 102h. The application data source 102a may include one or more databases configured to store information associated with implementing one or more applications. An application is generally software for performing a computing task or providing a computing service (e.g., for word processing, data analysis, data presentation, text searching, data presentation, and the like). The application data source 102a may store telemetry data 106 (e.g., information regarding the status, number of users, etc. of an application), event information 108 (e.g., information associated with a user input or selection in the application), and reference data 110 (e.g., a record of past telemetry data 106 and event information 108 for the application).

The infrastructure data source 102b may include one or more databases configured to store information associated with the computing infrastructure operated by an entity. This infrastructure may include any number of computing devices, servers, data warehouses, and the like. The infrastructure data source 102b may store telemetry data 106 (e.g., a measure of the amount of computing resources being consumed within the infrastructure), event information 108 (e.g., information associated with a change to the configuration of the infrastructure), and reference data 110 (e.g., a record of past telemetry data 106 and event information 108 for the infrastructure).

The finance and labor data source 102c may include one or more databases configured to store information associated with financial and labor information associated with the entity. The finance and labor data source 102c may store reference data 110 (e.g., a record of finance and labor related information for the business or entity). The transactional data source 102d may include one or more databases configured to store information associated with transactions performed by or associated with the entity. The transactional data source 102d may store telemetry data 106 (e.g., information regarding in-progress transactions) and reference data 110 (e.g., a record of past transactions).

The human resources and permission data source 102e may include one or more databases configured to store information associated with human resource management and employee permissions for the entity. The human resources and permission data source 102e may store reference data 110 (e.g., a record of human resource and permission information for individuals, such as employees and/or contractors, associated with the business or entity). The software lifecycle data source 102f may include one or more databases configured to store information associated with the development and maintenance of software tools used by the entity. The software lifecycle data source 102f may store event information 108 (e.g., information associated with changes to various software tools employed by the entity).

The operations and compliance data source 102g may include one or more databases configured to store information associated with the management and tracking of compliance with any regulations associated with the entity. The operations and compliance data source 102g may store reference data 110 (e.g., a record of actions, such as regulatory reporting, associated with compliance to any regulations to which the entity is subject). The project management data source 102h may include one or more databases configured to store information associated with the execution of projects by groups within the entity. The project management data source 102h may store reference data 110 (e.g., a record of past project-related actions, events, and completed tasks, such as purchases on a given project budget and the like).

As illustrated in FIG. 2, the event bus 114 extracts event data 104 from the data sources 102. The event bus 114 compares received event data 104 to a set of predefined criteria 202 (or rules) to detect events 116. The criteria 202 may include at least one requirement that portions 204, 206 of the event data 104 include characteristics corresponding to a known event (e.g., associated with the usage or operation of the data sources 102). In this example, the detected events 116 include a first event 116a which is associated with a first portion 202 of the monitored data 104 and a second event 116b which is associated with a second portion 204 of the monitored data 104. As an example, the criteria 202 may include a criteria that event data 104 is associated with a change to an application, a change to the computing infrastructure operated by the entity managing system 100, the execution of a transaction, the filing of documentation with a regulatory agency, the updating of a project or human resource-related record, and the like. For example, the first event 116a may be detected for a portion 204 of event data 104 that is associated with a transaction (e.g., that includes telemetry data 106 and event information 108 from the transactional data source 102d). As another example, the second event 116b may be detected for a portion 206 of event data 104 that is associated with a change to an application (e.g., data from the application data source 102a associated with execution of the application, infrastructure data source 102b associated with computing resources used to execute the application, and/or software lifecycle data source 102f associated with changes to the code of the application). In some embodiments, a method of machine learning or artificial intelligence is employed by the event bus 114 to detect events 116. For example, the predefined criteria 202 described above may be established using training data which includes previously detected events 116 that have been confirmed to have been correctly associated with previous event data 104.

The service mapping module 118 may receive the detected events 116 and map the events to services 210, 212. The services 210, 212 generally correspond to services provided by the entity operating the system 100. For example, the services 210, 212 may be a user transaction-related service (e.g., a service associated with facilitating a transaction of a certain type at a given location), an application service (e.g., a service associated with providing access to an application), a program management service (e.g., a service associated with monitoring the progress of internal activities of the entity operating the system 100), a software development service (e.g., a service associated with monitoring development of software used by the entity operating the system 100), a compliance service (e.g., a service associated with maintaining and/or tracking compliance with regulations imposed on the entity operating the system 100), and the like. The service mapping module 118 generally determines if an event 116 (i.e., the portions 204, 206 of event data 104 associated with different events 116a,b) satisfy predefined criteria 208 for mapping to different services 210, 212.

The criteria 208 generally include an indication of which characteristics the events 116a,b (e.g., the portions 204, 206 of event data 104 for each event 116a,b) should include in order for each event 116a,b to be mapped to a given service 210, 212. For example, the criteria 208 may include a unique set of characteristics that must be present in the portion 204, 206 of event data 104 in order for the corresponding event 116a,b to be mapped to a service 210, 212 associated with the set of characteristics. For example, the service mapping module 118 may identify that the portion 204, 206 of event data 104 associated with an event 116a,b includes information regarding user information, a payment type, a payment destination (e.g., recipient), payment amount, and the like. The presence of such information may satisfy the criteria 208 for mapping to a transaction service (e.g., a send-payment service). As another example, if the portion 204, 206 of event data 104 for a detected event 116a,b includes information about funds expended to pursue a project goal (e.g., information extracted from the project management data source 102*h*), the event 116*a,b* may be mapped to project management service 210, 212. As yet another example, an event 116*a* may be associated with (e.g., include a portion 204, 206 of event data 104 associated with) submitting information to regulatory agency. Such an event 116*a,b* may be automatically mapped to a compliance-related service 210, 212 of providing regulatory reporting. As another example, an event 116*a,b* associated with a change in the amount of available funds for a given project in the project program management data source 102*h* may be mapped to a project management or execution service 210, 212. In some cases, a single event 116*a* may be mapped to more than one service. For example, an event 116*a* mapped to a transaction service 210 may also be mapped to a project management service because a transaction may have an impact on the funding available for pursuing a given project.

In some cases, the criteria 208 may map events 116*a,b* to services 210, 212 based in part on the identity of the data source 102*a-h* from which the portion 204, 206 of event data was obtained. However, more generally information for a given service 210, 212 may appear in a number of the data sources 102*a-h*. Previous technology fails to efficiently and reliably associate information from multiple data sources to relevant services. The service mapping module 118 solves this problem of previous technology by facilitating the reliable mapping of events 116*a,b* to services 210, 212 based on criteria 208 rather than arranging the event data 104 based on their data source 102*a-h* alone. The front end 126 (see FIG. 1) may allow a user 138, 144*a,b* to view the mappings of events 116*a,b* to services 210,212, as described further below with respect to FIG. 3.

Still referring to FIG. 2, the event bus 114 also facilitates the routing of certain events 116 to the action automation module 120 and alert module 122 such that appropriate actions can be taken when an actionable event is detected. In other words, the detection of an actionable event 116*a,b* with appropriate characteristics may trigger either an automated action by the automated action module 120 or the initiation of a human-mediated action via the alert module 122. The event bus 114 employs a set of action criteria 214 to identify a subset of the detected actions 116 that are identified as actionable 216, 218. The action criteria 214 generally include a set of characteristics of the events 116*a,b* (e.g., the portions 204, 206 of event data 104 for each event 116*a,b*) which should be present in order for each event 116*a,b* to be actionable. An event 116*a,b* may be actionable if it is associated with an unwanted outcome (e.g., a problem or other issue) which may be resolved through some action and/or if the event 116*a,b* otherwise warrants some response or further action. As an example, the event bus 114 may detect that an event 116*a* is associated with an application repeatedly dropping in a certain data center. Since this performance issue may be resolved by moving the application to a different data center, the event 116*a* is determined to be actionable 216 and provided to the action automation module 220 such that an appropriate automated action 220 (e.g., moving the application to the different data center for this example) is performed automatically.

As another example, the event bus 114 may determine that another event 116*b* is actionable 218 but requires human interaction to complete the associated action. For example, based on the comparison of the events 116 to the action criteria 214, the event bus 114 may determine that the action(s) needed to resolve the event 116*b* involve human input, such as approval by an administrator or the like. The event bus 114 may pass the detected event 116*b* and the corresponding portion 206 of event data 104 to the alert module 122. The alert module 122 generally registers that the event 116*b* occurred that requires action by an individual (e.g., an administrator 138, 144*a,b*). This actionable event 116*b* may be placed in an "incident mode," and an alert 222 may be transmitted (e.g., to an administrator or user 138, 144*a,b*). The front end 126 may facilitate the user-friendly resolution of such an actionable event 116*b* by providing not only the indication of the actionable event 116*b* but also the appropriate context for resolving the event 116*b* (e.g., the portion 206 of the event data 104 may be presented in a user-readable format via the data integration module 128 of the front end 126, as described further below and with respect to FIG. 3).

The event bus 114 also facilitates the efficient storage of event data 104 in the data lake 124 such that the event data 104 may be accessed efficiently for downstream tasks (e.g., data analytics, data presentation, and the like). The event bus 114 generally determines that certain portions 204, 206 of the event data 104 are associated with predefined downstream tasks and tags these data portions 204, 206 of the event data 104 with task tags 226, 228 such that it may be efficiently accessed for performing these tasks at a later time. The tasks associated with the tags 226, 228 generally correspond to the anticipated downstream uses (e.g., for analytics, audit trail management, security assessment, etc.) of the data 104. Examples of downstream tasks which may be indicated by a corresponding tasks tag 226, 228 include provisioning a service dashboard, performing data analytics, performing machine learning and artificial intelligence tasks, maintaining an audit trail, providing event management resources, tracking compliance with regulations, and monitoring security profiles. Examples of tasks associated with the tasks tags 226, 228 are described further below with respect to the front end 126 in FIG. 3 below. As such, the event data 104 may be stored in a schema such that data 104 is tagged for efficiently performing downstream processing tasks. The data lake 124 may facilitate improved audit tracing, data analytics, data security, and the like based on the event data 104 by reliably associating ingested event data 104 to anticipated downstream tasks via tags 226, 228. Previous technology lacks such capabilities.

This allocation of tags to the event data 104 may be achieved by determining whether data 106, 108, 100 (e.g., portions 204, 206 of data 106, 108, 100 associated with events 116*a,b*) satisfy certain predefined task criteria 224 associated with different downstream tasks. The task criteria 224 generally include a set of predefined characteristics which should be present in the portions of event data 104 in order for the data portions 204, 206 to be associated with a given task (e.g., the different analysis, organization, reporting, and presentation tasks performed by the front end 126 described further with respect to FIG. 3 below). For instance, the portion 204 of event data 104 for event 116*a* may be associated with an attempted access to secure information. This portion 204 of event data 104 may satisfy criteria 224 for being automatically tagged as security-related information with a security analysis tag 226, such that it may be more efficiently and conveniently accessed for analysis of security protocols (e.g., using the front end 126 described below with respect to FIG. 3). As another example, the portion 206 of event data 104 for event 116*b* that is associated with performing a transaction may satisfy criteria 224 for being automatically tagged as transaction-related information with data analysis, transaction, and audit trail tags 228. Information stored in the data lake 124 is generally accessible to the front end 126 described further below with respect to FIG. 3.

Data Analysis and Visualization Front End

Figure 3:
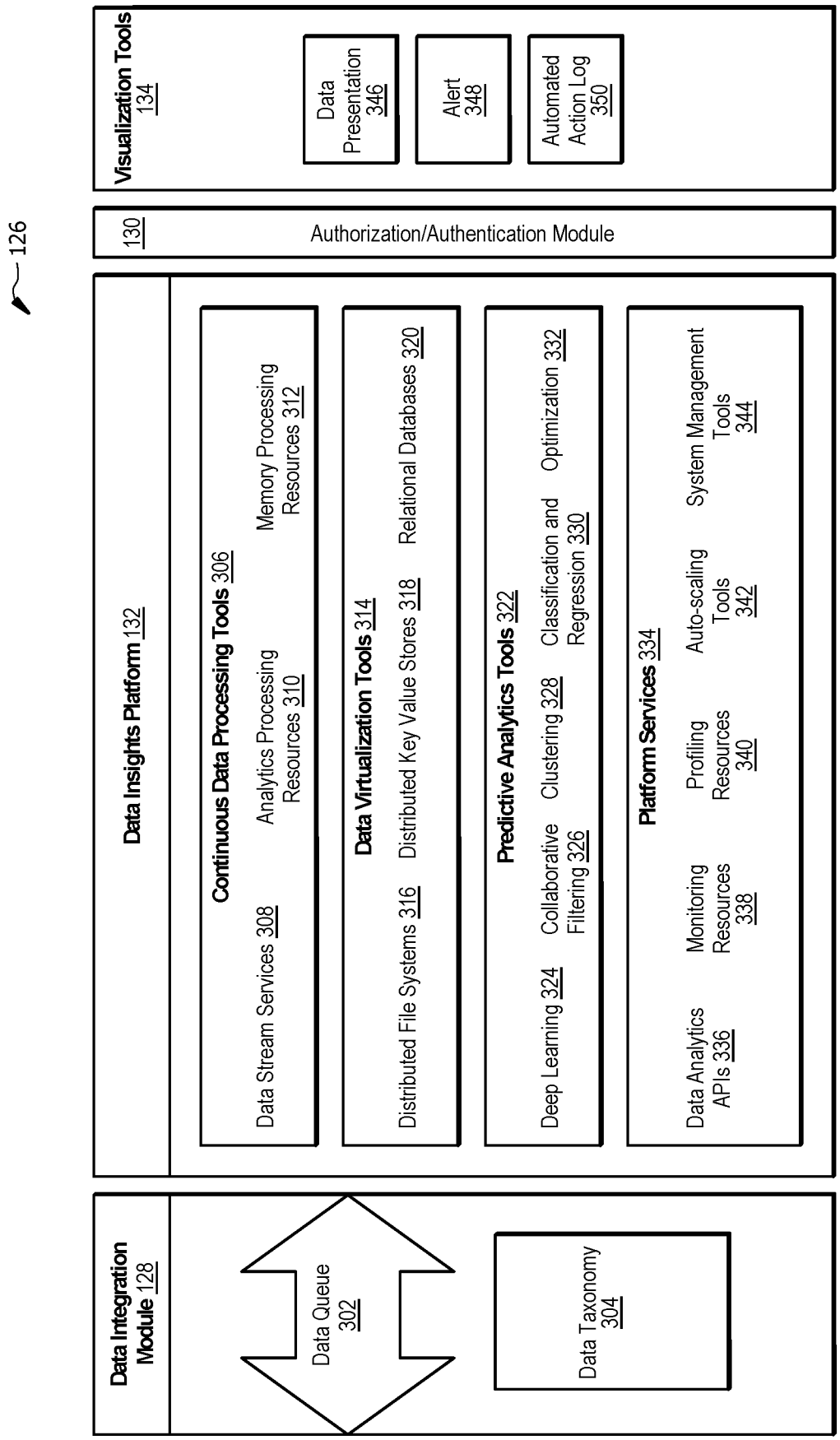
FIG. 3 is a diagram illustrating an example of the front end of the system illustrated in FIG. 1.

FIG. 3 illustrates an example of the analysis and visualization front end 126 in greater detail. As described above, the analysis and visualization front end 126 facilitates reporting, analytics, and visualization of the event data 104, the detected events 116, and any other information related to or provided by the modules 118, 120, 122. The data integration module 128 generally facilitates the efficient ingestion of information from the back end 112 into the front end 126 in a form that is usable to the users 138, 144a,b of the front end 126. The data integration module 128 may be a processing or management layer of the front end 126 which monitors event data 104 received by the front end 126 (e.g., from the data lake 124 and/or any one or more of the modules 118, 120, 122). The data integration module 128 includes a data queue 302 that determines in which sequence event data 104 is pulled into the front end 126. For example, the data integration module 128 may monitor when new event data 104 (e.g., with appropriate task tags 226, 228 as described above with respect to FIG. 2) is added to the data lake 124 and provide near real-time integration of this data 104 into the front end 126. The data queue 302 may also ensure that the amount of event data 104 pulled from the back end 112 does not exceed the computing resources of a device (e.g., device 136 of FIG. 1) used to implement the front end 126. For example, the data queue 302 may adjust the rate of data ingress to the front end 126 based on the amount of memory available to the device.

The data integration module 128 may further employ a taxonomy dataset 304 to translate data 104 from the data lake 124 and/or the module(s) 118, 120, 122 into user-interpretable information. The taxonomy dataset 304 may include one or more lookup tables associating data entries in the data lake 124 and/or the modules 118, 120, 122 to terminology employed by the users 138, 144a,b. For instance, the data integration module 128 may use the taxonomy dataset 304 to digest event data 104 from the data lake 124 and use the tags 226, 228 (see FIG. 2) provided by the event bus 114 to appropriately digest and redirect this data 104 such that it is most useful to the end users 138, 144a,b. As an illustrative example, a data entry of "1" in the event data 104 may be automatically translated to "yes," thereby allowing a user 138, 144a,b to easily understand the meaning of the data 104 without any specialized computer programming knowledge. In some embodiments, the taxonomy dataset 304 may include user-specific information for converting the event data 104 to terms, phrases, and/or other data representations (e.g., the format of the presentation of dates, times, locations, etc.) that can be more efficiently used based on a business unit in which a user 138, 144a,b works. For example, a first user 144a may work in a business unit that provides dates in reporting in the MONTH/DAY/YEAR format, while a second user 144b may work in a business unit that reports dates in the DAY/MONTH/YEAR format. The taxonomy dataset 304 may automatically convert date-related event data 104 into the appropriate format for these users 144a,b, such that little or no reformatting is required by the end users 144a,b.

The data authorization/authentication resource 130 acts as a security layer for the front end 126. The authorization/authentication resource 130 generally provides for the authentication and authorization of users 138, 144a,b to ensure that only appropriate information is provided to the users 138, 144a,b (i.e., based on their security clearance or authorization levels). A user 138, 144a,b may be authenticated by entering a password, providing a multifactor identification response, and the like.

As described above, the data insight platform 132 includes resources for analyzing and/or gaining other insights from the event data 104 accessed by the front end 126. As an example, the data insight platform 132 may include continuous data processing tools 306, data virtualization tools 314, predictive analytics tools 322, and/or platform services 334. The continuous data processing tools 306 generally facilitate the storage and analysis of event data 104 as it is provided by the data integration module 128. The data stream services 308 facilitate the near real-time ingestion and presentation (e.g., using visualization tool 134 described below) as data 104 is provided by the data integration module 128. The analytics processing resources 310 include processing resources available to the front end 126 for analyzing event data 104 and/or other information obtained from the back end 112 (e.g., from modules 118, 120, 122 described above).

The data virtualization tools 314 facilitate the implementation of the front end 126 and/or the storage of event data 104 using different virtual data stores including, for example, distributed file systems 316 (e.g., cloud servers), distributed key value stores 318, and relational databases 320. The predictive analytics tools 322 facilitate the quantitative analysis of the event data 104 and other information provided by the back end (e.g., from modules 118, 120, 122). The predicative analytics tools 322 may involve methods of machine learning and/or artificial intelligence. Examples of the predictive analytics tools 322 include those for performing deep learning 324, collaborative filtering 326, clustering 328, classification and regression 330, and optimization 332.

The platform services 334 generally facilitate interaction with the event data 104 (e.g., with task tags 226, 228 described with respect to FIG. 2 above). The platform services 334 may for instance include, APIs 336 for data analytics (e.g., tools for developing applications to analyze data 104), data monitoring resources 338 (e.g., tools for tracking infrastructure associated with data source 102b of FIG. 2), data summarization resources 340 (e.g., tools for extracting information, such as summaries and statistics, from data provided from the data integration module 128), auto-scaling tools 342 (e.g., tools for adjusting resources used to implement the front end 126), and system management tools 344 (e.g., tools for monitoring and adjusting resources used to implement the front end 126). As an example, the auto-scaling tools 342 may facilitate the automatic scale up or down of system and infrastructure resources for operating the front end 126 (e.g., to analyze a given data set, etc.). The system management tools 344 may be used for scheduling tasks, deploying infrastructure for tasks, and/or logging events. For example, the system management tools 344 may determine a cost (e.g., in terms of money and/or expenditure of computing resources) of operating some portion of computing infrastructure that is under- or over-utilized and determine whether the infrastructure may be restructured to operate more efficiently.

The visualization tools 134 include an array of graphic user interface-based tools which provide interaction with information obtained by the front end 126. The visualization tools may be presented in a graphical user interface via devices 136, 142a,b for viewing by a corresponding user 138, 144a,b. For example, the visualization tools 134 may facilitate the display of a data representation 346, such as a table, graph, list, or any other representation of information received by the front end 126. The data representation 346 may be based on information received from the data insights platform 132. The visualization tools 134 may facilitate the presentation of an alert 348 (e.g., alert 222 of FIG. 2) associated with the detection of an actionable event which needs a response from a user 138, 144a,b. The visualization tools 134 may provide for the viewing of an automated action log 350 which includes a record of automated actions performed by the automated action module 120 of the back end 112. The visualization tools 134 may further facilitate the visualization of information associated with detected events 116 (e.g., insights and results of analysis performed by the data insight platform 132 that are associated with particular detected events 116 and/or services mapped to these events by the service mapping module 118, described above with respect to FIGS. 1 and 2).

Example Device for Knowledge Management

Figure 4:
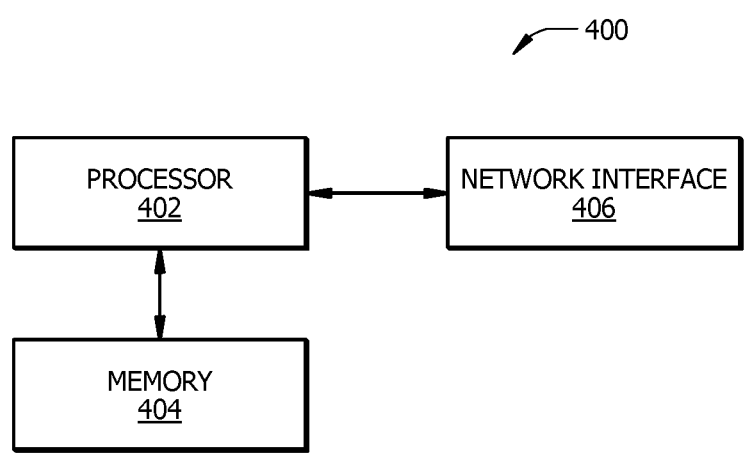
FIG. 4 is a diagram of an example device configured to implement the system of FIG. 1.

FIG. 4 is an embodiment of a device 400 configured to implement the system 100. The device 400 includes a processor 402, a memory 404, and a network interface 406. The device 400 may be configured as shown or in any other suitable configuration. The device 400 may be and/or may be used to implement the data sources 102, the data integration back end 112, the analysis and visualization front end 126, and user devices 136, 142a,b of FIG. 1.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 200 of FIG. 2. In some embodiments, the function described herein is implemented using logic units, FPGAs, ASICs, DSPs, or any other suitable hardware or electronic circuitry.

The memory 404 is operable to store any of the information described above with respect to FIGS. 1-3 along with any other data, instructions, logic, rules, or code operable to execute the function described herein. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
one or more data sources, each data source configured to collect and store event data, the event data, for each data source, comprising one or more of:
telemetry data comprising an operational status of the data source;
event information comprising information regarding an action performed by a user associated with the data source; and
reference data comprising a record of an organizational schema of the data source as a function of time; and
an event bus configured to:
monitor the event data of the one or more data sources;
determine that a first portion of the monitored event data satisfies a first task criteria, the first task criteria comprising at least one requirement that the first portion of the monitored event data includes a characteristic associated with a first task, wherein the first task comprises changing a configuration of a computing infrastructure;
associate the first portion of the monitored event data with a first tag associated with the first task;

determine that a second portion of the monitored event data satisfies a second task criteria, the second task criteria comprising at least one requirement that the second portion of the monitored event data includes a characteristic associated with a second task, wherein the second task comprises updating a data record;

associate the second portion of the monitored event data with a second tag associated with the second task; and provide the first portion of the monitored event data with the first tag and the second portion of the monitored event data with the second tag for storage in a data lake.

2. The system of claim 1, the event bus further configured to determine that the first portion of the monitored event data satisfies predefined event criteria, the predefined event criteria comprising at least one requirement that the first portion of the monitored event data includes a characteristic corresponding to an event associated with one or more data sources.

3. The system of claim 2, the event bus further configured to provide the event and the associated first portion of the monitored event data to a service mapping module, the service mapping module configured to:

determine that the first portion of the monitored event data satisfies predefined service criteria, the predefined service criteria comprising at least one requirement that the first portion of the monitored event data includes a characteristic associated with a provided service; and associate the event with the provided service.

4. The system of claim 3, wherein the first portion of the monitored event data associated with the event comprises user information received in an application, a payment amount, a payment destination, and the provided service is a transaction service.

5. The system of claim 3, further comprising a front end resource communicatively coupled to the event bus, the front end resource configured to provide a representation of a mapping of the event to the provided service for viewing by a user.

6. The system of claim 2, the event bus further configured to:

determine, based on a comparison of the first portion of the monitored event data to predefined action criteria, that the first event is an actionable event, the predefined action criteria comprising at least one requirement that the first portion of the monitored event data includes a characteristic associated with the actionable event;

identify an automatable action associated with responding to the actionable event; and provide the actionable event to an action automation module associated with the event bus, the action automation module configured to automatically perform the automatable action.

7. The system of claim 6, wherein the actionable event comprises dropping an application from a data center greater than a threshold number of times, and the automatable action is automatically reassigning the application to a different data center.

8. The system of claim 1, the event bus further configured to:

determine, based on a comparison of the first portion of the monitored event data to predefined action criteria, that the first event is an actionable event, the predefined action criteria comprising at least one requirement that the first portion of the monitored event data includes a characteristic associated with the actionable event;

identify a human-mediated action associated with responding to the actionable event; and provide the actionable event and the first portion of the monitored event data to an alert module associated with the event bus, the alert module configured to automatically provide an alert for viewing by a user, wherein the alert includes information, based on the first portion of the monitored event data, for resolving the actionable event.

9. The system of claim 8, wherein the actionable event comprises greater than a threshold amount of failed login attempts occurring, and the alert comprises a security alert and an indication of an application associated with the failed login attempts.

10. A method comprising:

monitoring event data of one or more data sources, the event data, for each data source, comprising one or more of:

telemetry data comprising an operational status of the data source;

event information comprising information regarding an action performed by a user associated with the data source; and reference data comprising a record of an organizational schema of the data source as a function of time;

determining that a first portion of the monitored event data satisfies a first task criteria, the first task criteria comprising at least one requirement that the first portion of the monitored event data includes a characteristic associated with a first task, wherein the first task comprises changing a configuration of a computing infrastructure;

associating the first portion of the monitored event data with a first tag associated with the first task;

determining that a second portion of the monitored event data satisfies a second task criteria, the second task criteria comprising at least one requirement that the second portion of the monitored event data includes a characteristic associated with a second task, wherein the second task comprises updating a data record;

associating the second portion of the monitored event data with a second tag associated with the second task; and providing the first portion of the monitored event data with the first tag and the second portion of the monitored event data with the second tag for storage in a data lake.

11. The method of claim 10, further comprising determining that the first portion of the monitored event data satisfies predefined event criteria, the predefined event criteria comprising at least one requirement that the first portion of the monitored event data includes a characteristic corresponding to an event associated with one or more data sources.

12. The method of claim 11, further comprising:

determining that the first portion of the monitored event data satisfies predefined service criteria, the predefined service criteria comprising at least one requirement that the first portion of the monitored event data includes a characteristic associated with a provided service; and associating the event with the provided service.

13. The method of claim 12, wherein the first portion of the monitored event data associated with the event comprises user information received in an application, a payment amount, a payment destination, and the provided service is a transaction service.

14. The method of claim 12, further comprising providing a representation of a mapping of the event to the provided service for viewing by a user.

15. The method of claim 11, further comprising:
   determining, based on a comparison of the first portion of the monitored event data to predefined action criteria, that the first event is an actionable event, the predefined action criteria comprising at least one requirement that the first portion of the monitored event data includes a characteristic associated with the actionable event;
   identifying an automatable action associated with responding to the actionable event; and
   providing the actionable event to an action automation module associated with the event bus, the action automation module configured to automatically perform the automatable action.

16. The method of claim 15, wherein the actionable event comprises dropping an application from a data center greater than a threshold number of times, and the automatable action is automatically reassigning the application to a different data center.

17. The method of claim 10, further comprising:
   determining, based on a comparison of the first portion of the monitored event data to predefined action criteria, that the first event is an actionable event, the predefined action criteria comprising at least one requirement that the first portion of the monitored event data includes a characteristic associated with the actionable event;
   identifying a human-mediated action associated with responding to the actionable event; and
   providing the actionable event and the first portion of the monitored event data to an alert module associated with the event bus, the alert module configured to automatically provide an alert for viewing by a user, wherein the alert includes information, based on the first portion of the monitored event data, for resolving the actionable event.

18. The method of claim 17, wherein the actionable event comprises greater than a threshold amount of failed login attempts occurring, and the alert comprises a security alert and an indication of an application associated with the failed login attempts.

19. A device comprising:
   a memory configured to store a first task criteria and a second task criteria, each of the first and second task criteria associating data to a related task; and
   a processor coupled to the memory and configured to:
      monitor event data of one or more data sources, the event data, for each data source, comprising one or more of:
         telemetry data comprising an operational status of the data source;
         event information comprising information regarding an action performed by a user associated with the data source; and
         reference data comprising a record of an organizational schema of the data source as a function of time;
      determine that a first portion of the monitored event data satisfies the first task criteria, the first task criteria comprising at least one requirement that the first portion of the monitored event data includes a characteristic associated with a first task, wherein the first task comprises changing a configuration of a computing infrastructure;
      associate the first portion of the monitored event data with a first tag associated with the first task;
      determine that a second portion of the monitored event data satisfies the second task criteria, the second task criteria comprising at least one requirement that the second portion of the monitored event data includes a characteristic associated with a second task, wherein the second task comprises updating a data record;
      associate the second portion of the monitored event data with a second tag associated with the second task; and
      provide the first portion of the monitored event data with the first tag and the second portion of the monitored event data with the second tag for storage in a data lake.

20. The device of claim 19, the event bus further configured to:
   determine that the first portion of the monitored event data satisfies predefined event criteria, the predefined event criteria comprising at least one requirement that the first portion of the monitored event data includes a characteristic corresponding to an event associated with one or more data sources; and
   provide the event and the associated first portion of the monitored event data to a service mapping module, the service mapping module configured to:
      determine that the first portion of the monitored event data satisfies predefined service criteria, the predefined service criteria comprising at least one requirement that the first portion of the monitored event data includes a characteristic associated with a provided service; and
      associate the event with the provided service.

* * * * *